April 19, 1927.

H. B. PALM ET AL 1,625,677

HOG GREASER

Filed July 19, 1926

Inventors
Herbert B. Palm &
Bernard L. Palm,
By
Attorney

Patented Apr. 19, 1927.

1,625,677

UNITED STATES PATENT OFFICE.

HERBERT B. PALM AND BERNARD L. PALM, OF HURON, SOUTH DAKOTA.

HOG GREASER.

Application filed July 19, 1926. Serial No. 123,558.

This invention relates to hog greasers, and particularly to a device which may be termed a "rubbing post", having novel means by which grease is automatically applied to the rubbing surface in order that the grease will be smeared on that portion of the hog which contacts the rubbing surface; this invention being distinguished from hog oilers for the reason that the application of grease is advantageous over the application of oil, since grease will prove of greater benefit to the skin of the animal and at the same time it will close the pores of the parasite and hasten the destruction of the parasite.

It is furthermore an object of this invention to produce a rubbing post associated with a grease applicator, so arranged as to be automatically movable with relation to the rubbing post and effective to distribute grease on the rubbing surface of the post. The grease distributor may be so mounted as to be moved by pressure of the animal during the rubbing process, and under certain conditions, it is movable by force of the wind so that proper distribution of the grease will be effected as the animal is using the rubbing post, or, as stated, it may be distributed by the action of relatively strong wind currents.

It is a still further object of this invention to provide a grease holder having novel means by which it is rotatably mounted on the post; and it is furthermore an object of the invention to produce a device of the character indicated which will be comparatively inexpensive to produce and maintain.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1:
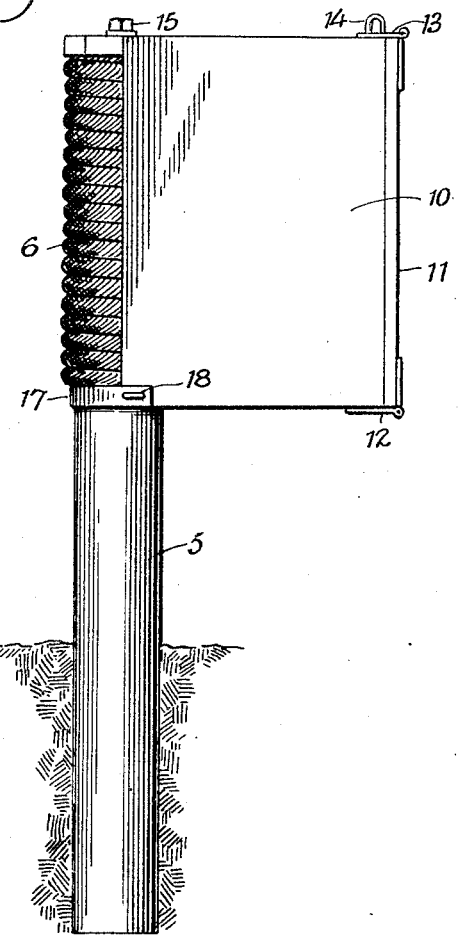
Figure 1 illustrates a view in elevation of a post and applicator embodying the invention.
Figure 2:
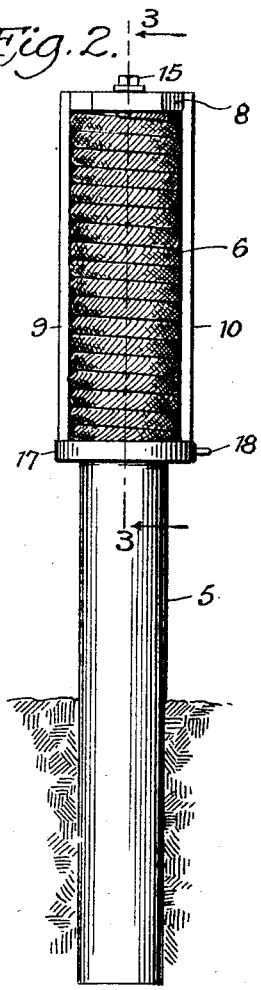
Figure 2 illustrates a view in elevation of the device in a position at right angles to that shown in Fig. 1.

In these drawings, 5 denotes a suitable post having a rope or other element 6 wrapped around it, which constitutes the rubbing surface. This rubbing surface may be located a suitable distance above the ground in which the post is anchored, and as this is a matter of proportion, it need not be specified particularly. While rope is found to have the qualities requisite for producing the rubbing surface, it also is sufficiently absorbent to retain the grease in quantities which would prove effective for the use intended, and hence it is thought to be the preferred material for the rubbing surface, although the inventors do not wish to be limited with respect to this.

The grease applicator or holder comprises, in the present embodiment of the invention, a bottom 7, a top 8, side walls 9 and 10, and a closure or door 11. The door is preferably provided with a hinge 12 that is anchored to the bottom 7 and the door may be held closed by a hasp 13 and staple 14, which latter is anchored to the top of the casing.

As a means for rotatably applying the closure or casing to the post, the top 8 extends over the top of the post, and it is rotatably mounted on a stud or pin 15 anchored to the post and projecting from the top thereof through an aperture 16. A curved plate or strap 17 embraces the post below the rubbing surface and its ends are connected to the sides 9 and 10 of the case. Preferably one end is secured to a side 9 by fastenings such as screws, whereas the other end may be applied to a fastening 18 such as a staple, in order that when desired, the strap may be removed from the staple and the container may be dislodged from the post.

A follower 19 is movable within the grease container and it is urged inwardly by pressing means 20 such as springs of such strength as to overcome the resistance of grease 21 which may be contained in the case between the follower and the rubbing surface. It is seen, of course, that the container does not have a wall at the inner edge, but that the grease is free to be discharged at the inner edge of the container into contact with the rubbing surface. Preferably the outer ends of the springs are attached to a plate or board 22 and the inner ends of the springs are attached to the follower in order that the follower and springs may be removed from the container as a unit when the container is to be replenished with grease.

Figure 3:
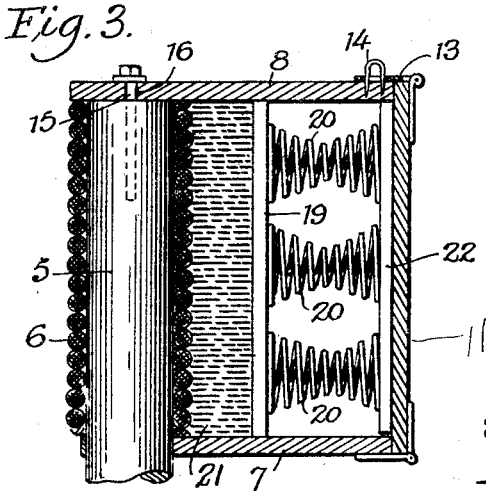
Figure 3 illustrates a sectional view on the line 3—3 of Fig. 2.
Figure 4:
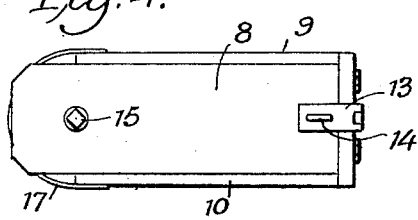
Figure 4 illustrates a top plan view of the device.

From an inspection of Fig. 3, it will be apparent that the container being rotatably mounted on the post will move around the post, due to the pressure of the animal while in the act of rubbing, and therefore, grease will be spread on the rubbing surface and it will, of course, be taken up by the animal using the post. So long as a supply of grease is maintained in the container, the application of grease to the animal, will be practically automatic and the post will therefore be a matter of relief to the animal using it.

We claim:

1. In a rubbing post, a post having an absorbent rubbing surface, a grease container rotatably mounted on the post, and means for holding the grease in the container in contact with the rubbing surface.

2. In a rubbing post, a post having a rubbing surface, a device rotatably mounted on the post and operative to distribute grease on the exterior of the rubbing surface.

3. In a hog greaser, a rubbing post having a rubbing surface, a grease carrier rotatably mounted thereon, and means associated with the grease carrier for forcing grease into contact with the rubbing surface.

4. A hog greaser comprising a post having a fibrous rubbing surface, a grease applicator rotatably mounted with relation to the post for movement around the rubbing surface, and means for forcing grease from the applicator into contact with the rubbing surface.

5. In a hog greaser, a rubbing post, a container mounted for rotation around the rubbing surface of the post, a follower within the container operative to press grease into engagement with the rubbing surface, and means for retaining the parts in operative relation within the container.

HERBERT B. PALM.
BERNARD L. PALM.